US012716812B2

(12) United States Patent
Smith et al.

(10) Patent No.: US 12,716,812 B2
(45) **Date of Patent: *Aug. 25, 2026**

(54) BEARING PAD MONITORING SYSTEMS AND METHODS

(71) Applicant: The Heil Co., Chattanooga, TN (US)

(72) Inventors: John Forrest Smith, Fort Payne, AL (US); Garrett J. Eckerl, Fort Payne, AL (US)

(73) Assignee: The Heil Co., Chattanooga, TN (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/810,882

(22) Filed: Aug. 21, 2024

(65) Prior Publication Data

US 2025/0164349 A1 May 22, 2025

Related U.S. Application Data

(63) Continuation of application No. 17/824,565, filed on May 25, 2022, now Pat. No. 12,078,567.

(60) Provisional application No. 63/193,953, filed on May 27, 2021.

(51) Int. Cl.
*G01M 13/04* (2019.01)

(52) U.S. Cl.
CPC .................................. *G01M 13/04* (2013.01)

(58) Field of Classification Search
CPC .................................................... G01M 13/04
See application file for complete search history.

(56) References Cited

U.S. PATENT DOCUMENTS

| | | | | |
|---|---|---|---|---|
| 3,719,403 | A | 3/1973 | Sung | |
| 4,759,452 | A | 7/1988 | Faint et al. | |
| 6,123,497 | A | 9/2000 | Duell et al. | |
| 6,726,437 | B2 | 4/2004 | Albright et al. | |
| 8,827,559 | B2 | 9/2014 | Gentry et al. | |
| 9,556,898 | B2 | 1/2017 | Gentry et al. | |
| 11,319,148 | B2 | 5/2022 | Price et al. | |
| 12,078,567 | B2 * | 9/2024 | Smith | G01M 13/04 |
| 12,352,308 | B2 * | 7/2025 | Frydendal | F16C 17/04 |
| 2014/0056637 | A1 | 2/2014 | Gentry et al. | |
| 2019/0345973 | A1 | 11/2019 | Gentry et al. | |
| 2020/0354146 | A1 | 11/2020 | Price et al. | |
| 2022/0381647 | A1 | 12/2022 | Smith et al. | |
| 2022/0412398 | A1 | 12/2022 | Gentry et al. | |

FOREIGN PATENT DOCUMENTS

| | | | | |
|---|---|---|---|---|
| CN | 107074336 A | * | 8/2017 | G01B 5/146 |
| JP | 2023030064 A | * | 3/2023 | F16C 32/06 |

* cited by examiner

*Primary Examiner* — Octavia Hollington
(74) *Attorney, Agent, or Firm* — Fish & Richardson P.C.

(57) ABSTRACT

A refuse vehicle includes a telescopic arm, a sensor, and a processor. The telescopic arm includes an outer boom defining a bore, an inner boom received in the bore of the outer boom, and a bearing pad received in the bore and located between an exterior surface of the inner boom and an interior surface of the outer boom. The sensor is configured to output data indicating a position of a load-bearing limb of the telescopic arm. The processor is configured to receive data output from the sensor and determine a wear-state of the bearing pad based on the position.

21 Claims, 9 Drawing Sheets

66
20
22
34
52
32
28
30
26
24

BEARING PAD MONITORING SYSTEMS AND METHODS

CROSS-REFERENCE TO RELATED APPLICATIONS

This application is a continuation of U.S. patent application Ser. No. 17/824,565, entitled "Bearing Pad Monitoring Systems And Methods," filed May 25, 2022, which claims the benefit under 35 U.S.C. § 119(e) of U.S. Patent Application No. 63/193,953, entitled "Bearing Pad Monitoring Systems And Methods," filed May 27, 2021, which are incorporated herein by reference in their entirety.

TECHNICAL FIELD

This disclosure generally relates to side-loading refuse vehicles, and more particularly to side-loading refuse vehicles featuring components of a bearing pad monitoring system.

BACKGROUND

Various types of refuse vehicles exist in the art. These vehicles can include different types of collection arms. The collection arms move from a pick-up position, picking up a refuse container at street level, to a dump position, dumping the refuse in a hopper of the refuse vehicle. For a side-loading refuse vehicle, the collection arm is often a telescopic arm that relies on bearing pads to support the telescopic mechanism. The bearing pads can be designed such that they are replaced after a fixed amount of time or a fixed number of cycles. While this basic technique of monitoring bearing pad wear is viable in certain contexts, it is relatively imprecise and prone to premature or overdue replacements.

SUMMARY

In general, this disclosure relates to bearing pad monitoring systems and methods of using the same. Such bearing pad monitoring systems use a sensor (e.g., an inclinometer) that is configured to output data indicating a position of a load-bearing limb of the telescopic arm, which can then be used to determine a wear-state of the bearing pad.

One aspect of the present disclosure features a refuse vehicle including a refuse vehicle, including: a telescopic arm including: an outer boom defining a bore; an inner boom received in the bore of the outer boom; a bearing pad received in the bore and located between an exterior surface of the inner boom and an interior surface of the outer boom; a sensor configured to output data indicating a position of a load-bearing limb of the telescopic arm; and a processor configured to: receive data output from the sensor; and determine a wear-state of the bearing pad based on the position of the load-bearing limb.

Embodiments may include one or more of the following features.

In some embodiments, the position includes an angular position.

In some embodiments, the angular position is measured relative to a vertical axis.

In some embodiments, the angular position is measured relative to a horizontal axis.

In some embodiments, the sensor includes an inclinometer.

In some embodiments, the load-bearing limb includes the inner boom.

In some embodiments, the sensor is mounted on the load-bearing limb.

In some embodiments, the telescopic arm includes a grabber beam coupling a receptacle grabber beam assembly to the inner boom.

In some embodiments, the sensor is mounted on the grabber beam.

In some embodiments, the sensor is located at a distal end of the grabber beam relative to the bearing pad.

In some embodiments, the load-bearing limb is the grabber beam.

In some embodiments, the processor is configured to determine the wear-state when the telescopic arm is in a rest position.

In some embodiments, the processor determines the wear-state by:

comparing the data output from the sensor to one or more thresholds.

In some embodiments, the processor is configured to calibrate the one or more thresholds based on historical data output from the sensor.

In some embodiments, the one or more thresholds are static, predetermined thresholds.

In some embodiments, the processor determines the wear-state by: monitoring an incremental change in the position of the load-bearing limb based on the data output from the sensor.

In some embodiments, the refuse vehicle further includes a user interface configured to present the wear-state of the bearing pad to a user.

In some embodiments, the refuse vehicle further includes a second bearing pad and a second sensor, wherein the processor is further configured to determine the wear-state of the second bearing pad based on data output from the second sensor.

In some embodiments, the sensor is a first sensor, and the first and second sensors are mounted at different locations on the load-bearing limb.

Another aspect of the present disclosure features a method of monitoring a wear-state of a bearing pad residing between an inner boom and an outer boom of a telescopic arm carried on a refuse vehicle. The method includes receiving data output from a sensor indicating a position of a load-bearing limb of the telescopic arm; and determining the wear-state of the bearing pad based on the position of the load-bearing limb while the telescopic arm is in a rest position.

All publications, patents, and patent applications mentioned in this specification are herein incorporated by reference to the same extent as if each individual publication, patent, patent application, or item of information was specifically and individually indicated to be incorporated by reference. To the extent publications, patents, patent applications, and items of information incorporated by reference contradict the disclosure contained in the specification, the specification is intended to supersede and/or take precedence over any such contradictory material.

The use of terminology such as "front," "back," "forward," and "rearward" throughout the specification and claims is for describing the relative positions of various components of the refuse vehicle and other elements described herein. Similarly, the use of any horizontal or vertical terms to describe elements is for describing relative orientations of the various components of the refuse vehicle and other elements described herein. Unless otherwise stated explicitly, the use of such terminology does not imply a particular position or orientation of the refuse vehicle or any other components relative to the direction of the Earth gravitational force, or the Earth ground surface, or other particular position or orientation that the system or other elements may be placed in during operation, manufacturing, and transportation.

The details of one or more embodiments of the invention are set forth in the accompa-nying drawings and the description below. Other features, objects, and advantages of the invention will be apparent from the description, the drawings, and the claims.

DESCRIPTION OF DRAWINGS

Like reference symbols in the various drawings indicate like elements.

DETAILED DESCRIPTION

Embodiments described below include refuse vehicles (e.g., side-loading refuse vehicles) featuring bearing pad monitoring systems and methods. These embodiments use the output of one or more sensors to determine a wear-state of one or more bearing pads installed on the refuse vehicles. In some embodiments, the refuse vehicles include collection arms designed to extend and contract through telescopic movement. The telescopic collection arms include bearing pads secured to an inner boom and/or an outer boom. The bearing pads reside between the inner boom and the outer boom to facilitate telescopic movement.

Bearing pads installed on telescopic collection arms in some refuse vehicles are difficult to inspect visually because they are not often exposed. This poses a problem with monitoring the pads' wear-state. Without proper monitoring, bearing pad wear could go unnoticed until it causes costly structural damage. One advantage of the embodiments described below is that they monitor the wear-state of bearing pads by observing a different, more accessible portion of the collection arm. As a result, the user can be informed of bearing pad wear without visually inspecting the pads.

The embodiments described below may prevent unplanned down time associated with missing the critical replacement point (e.g., prior to causing structural damage) of a bearing pad. Additionally, by predicting or forecasting when bearing pads will need to be inspected or changed, expensive unplanned down time can be supplanted by planned down time (e.g., during convenient off hours) accounted for in fleet management and maintenance scheduling. Unnecessary costs may also be reduced and/or entirely prevented by avoiding repairs and replacement of damaged structural components caused by worn-out bearing pads.

The embodiments described below may improve the efficiency of bearing pad usage compared to conventional replacement schedules based on predetermined time and/or cycle heuristics, where bearing pads may be prematurely replaced before the end of their useful life. In other words, the embodiments of this disclosure may improve the accuracy of determining when one or more bearing pads are ready to be replaced by monitoring the wear-state instead of simply tracking time or cycles alone.

Figure 1:
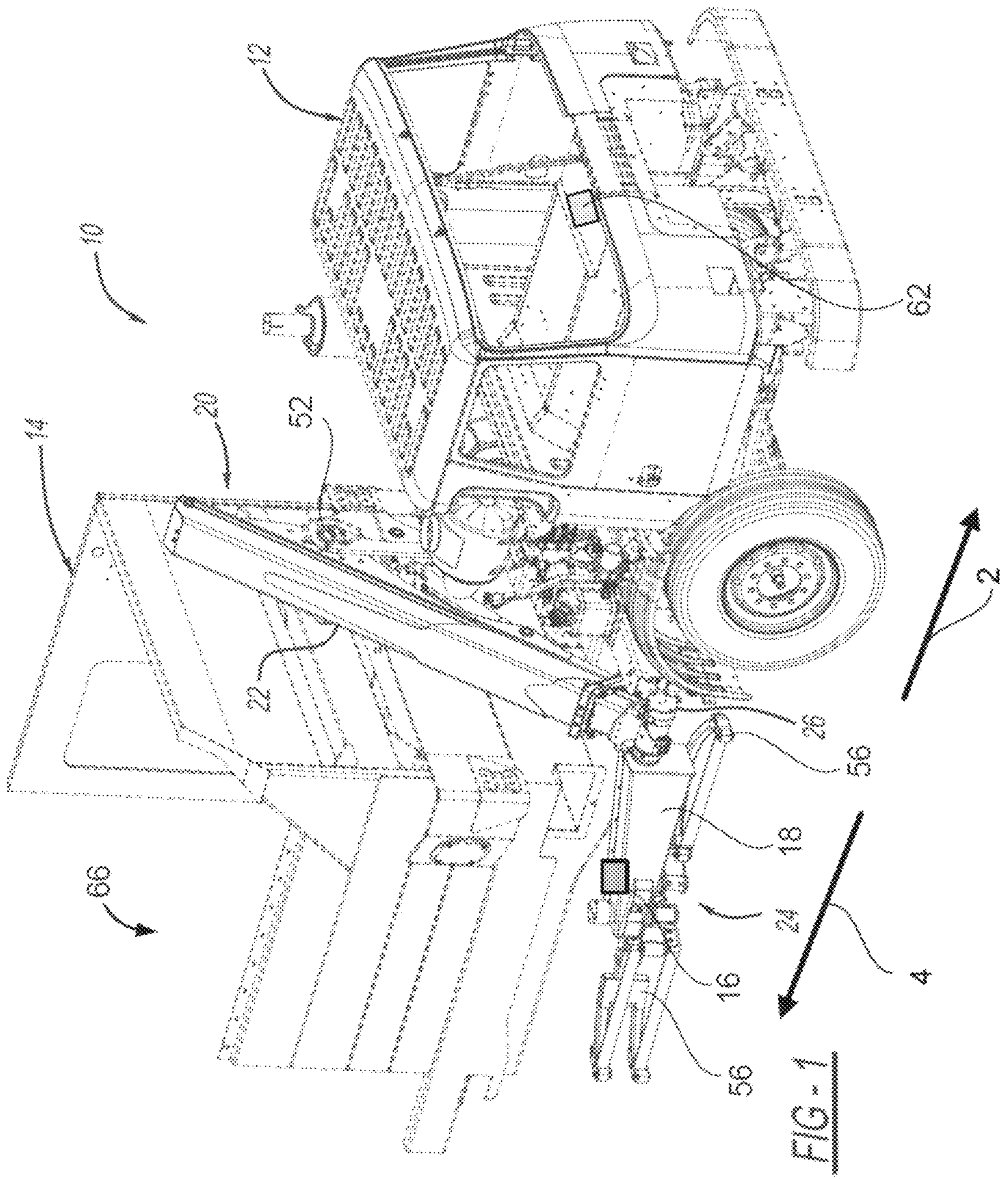
FIG. 1 is a perspective view of a side-loading refuse vehicle including a telescopic arm assembly.

FIG. 1 illustrates a perspective view of an example side-loading refuse vehicle 10 in accordance with one or more embodiments of the present disclosure. Side-loading refuse vehicle 10 defines opposite forward 2 and rearward 4 directions of travel (see arrows in FIG. 1). The side-loading refuse vehicle 10 includes a cab 12, a body 14, and a refuse container 66. Cab 12 is coupled to a forward portion of a chassis (not shown in the figures) of the side-loading refuse vehicle 10. Refuse container 66 is coupled to the chassis rearward of cab 12. Refuse container 66 serves as a loading chamber or "hopper" for refuse. Refuse dumped into the side-loading refuse vehicle 10 is received by refuse container 66 and compacted into the body 14 with a packer or eject panel (not shown in the figures). The body 14 stores compacted refuse until the load is disposed of at a landfill, for example.

Side-loading refuse vehicle 10 further includes a telescopic arm 20 secured to the refuse container 66. The telescopic arm 20 includes a boom section 22 and a receptacle grabber arm assembly 24. The boom section 22 is operatively connected (e.g., via hydraulic line, electric wiring harness, or other) with a system on the refuse vehicle that can provide motive power (for example, a hydraulic system, an electric power system, a pneumatic system, or other means) to move the telescopic arm 20 between different positions (e.g., dump position and pick-up position). The hydraulic components described herein are merely exemplary and not intended to limit the present disclosure in any way. Other embodiments are contemplated to be within the scope of the present disclosure. For example, other contemplated embodiments include an electrically powered system for moving the telescopic arm 20. The receptacle grabber arm assembly 24 includes a grabber beam 18 that couples the receptacle grabber arm assembly 24 with the boom section 22. The grabber beam 18 is driven by a rotary actuator 26. The receptacle grabber arm assembly 24 further includes grabber arms 56 that move between grasping and release positions. The refuse vehicle includes a sensor 16 configured to output data indicating a position of a load-bearing limb (e.g., the grabber beam 18) of the telescopic arm 20. In some embodiments, the grabber beam 18 includes sensor 16.

The refuse vehicle 10 further includes a computer control system. The computer control system includes a processor 62, a power source, a plurality of input devices, a plurality of output devices, a plurality of processor-based interface modules, and a communication network. In some embodiments, the communication network is a wired communication network, a wireless communication network, or a combination of both. In some embodiments, the communication network is an external data network. In addition to wireless network communications external to the side-loading refuse vehicle 10, one or more internal network subsystems may exist in the vehicle to provide communication pathways to various devices distributed throughout the vehicle. In some embodiments, the communication network is an internal communication network (e.g., a controller area network). The side-loading refuse vehicle 10 can include different internal network subsystems such as, but not limited to, bus subsystems, Ethernet subsystems, wireless subsystems, or any other network architecture capable of conveying electronic information across one or more devices.

Figure 2:
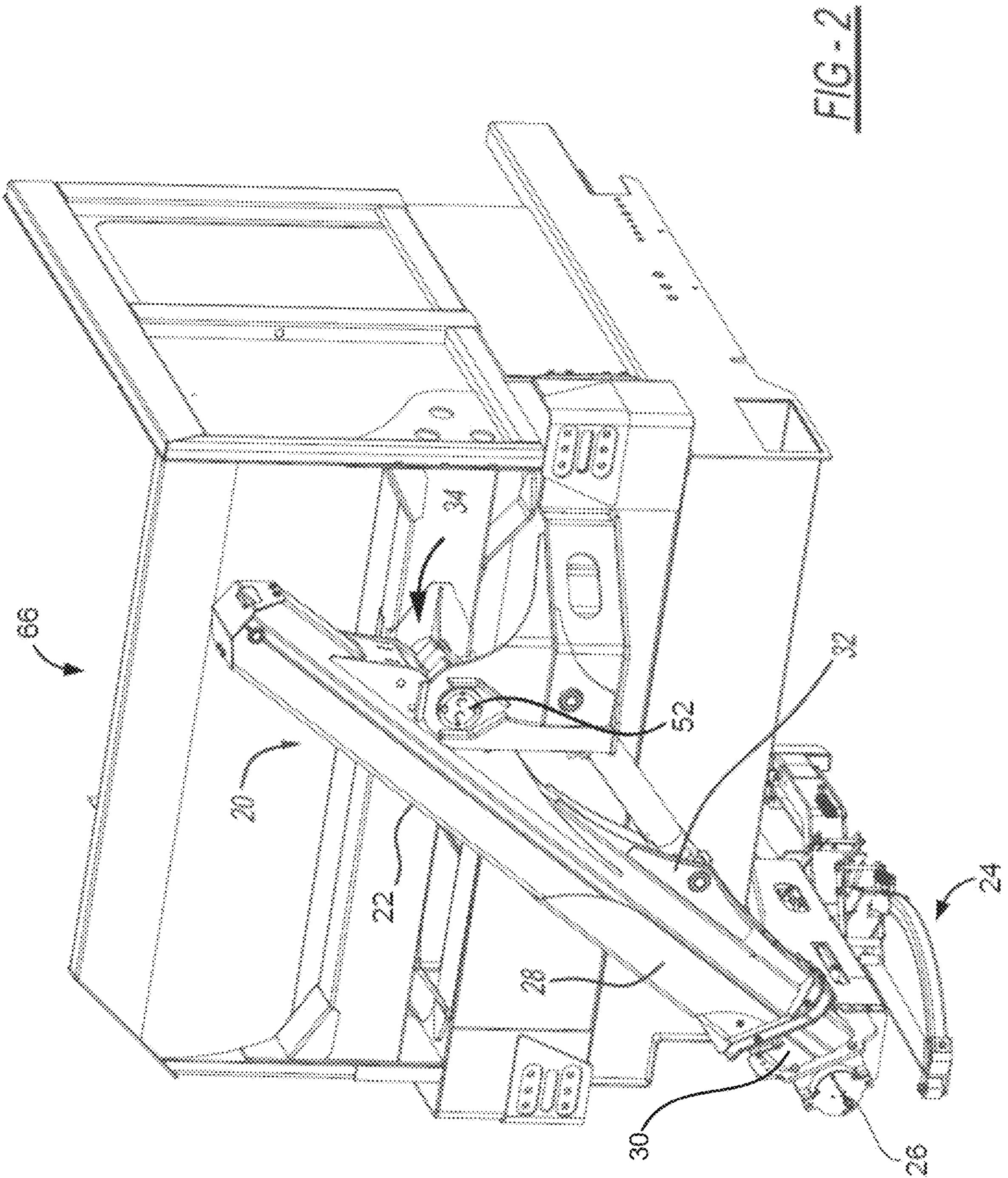
FIG. 2 is a perspective view of the telescopic arm assembly.

The processor 62 is configured to receive data output from the sensor 16 and determine a wear-state of one or more bearing pads based on the position of the load bearing limb. The processor 62 is configured to determine the wear-state of one or more bearing pads when the telescopic arm 20 is in a rest position. The telescopic arm 20 is in a rest position when the grabber beam 18 and the grabber arms 56 are parallel to a ground surface. For example, the processor 62 is configured to determine the wear-state of one or more bearing pads based on the position of the grabber beam 18 and the grabber arms 56 when the grabber beam 18 and the grabber arms 56 are parallel to a ground surface. In another example, the processor 62 is configured to determine the wear-state of one or more bearing pads based on the position of an inner boom 30 when the inner boom 30 is fully or near fully retracted into the outer boom 28, as seen in FIG. 2. In some examples, the telescopic arm 20 is in a rest position when the grabber beam 18 sits on a rest that is coupled to the refuse vehicle 10 while being parallel to a ground surface. In some embodiments, the telescopic arm 20 is in a rest position when the grabber beam 18 is raised above the rest while being parallel to a ground surface. The rest may be coupled to the chassis or a frame of the refuse vehicle 10 on a side of the refuse vehicle 10 that is the same side onto which the telescopic arm 20 is mounted.

Referring to FIG. 2, the boom section 22 of the telescopic arm 20 includes an outer boom 28 and an inner boom 30. The inner boom 30 is extendable and is nested within the outer boom 28 for axial telescopic movement in and out of a distal end of the outer boom 28. The outer boom 28 includes a linear actuator mounting portion 32 as well as a mounting assembly 34. The mounting assembly 34 pivotally secures the outer boom 28 with the refuse container 66. The outer boom 28 is an elongated member defining a bore that is sized to telescopically receive the inner boom 30. Inner boom 30 is mounted in the bore of outer boom 28 and is configured to translate telescopically through the bore.

Figure 3:
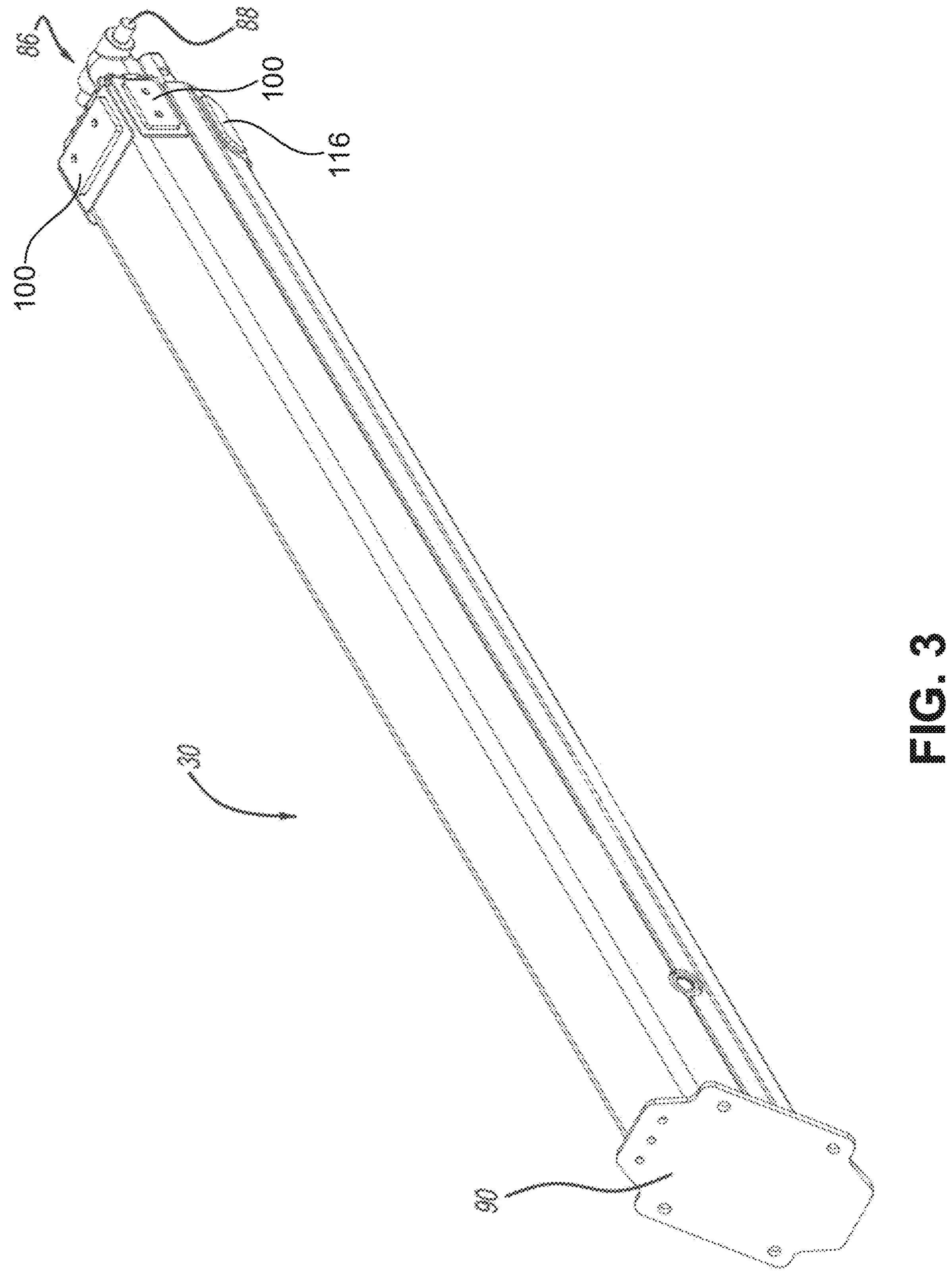
FIG. 3 is a perspective view of the inner boom.

As shown in FIG. 3, a cylinder 86 is positioned inside of the inner boom 30. The linear actuator 86 is operatively connected to the inner boom 30 and the outer boom 28. The linear actuator 86 can be a telescopic cylinder that is configured to perform extension and retraction of the inner boom 30 within the outer boom 28. In some examples, the linear actuator 86 is a hydraulic cylinder. Linear actuator 86 can be connected, generally, via hydraulic lines (or electric wiring harness, or other) with a refuse vehicle hydraulic system (or battery electric power system, or other) to move the mounting assembly 34 between various positions. The linear actuator 86 includes an end portion 88 that is secured to the outer boom 28 in order to facilitate telescopic articulation of the inner boom 30 within the outer boom 28. The inner boom 30 includes a plate 90 that receives the rotary actuator 26 (shown in FIGS. 1 and 6).

Figure 4:
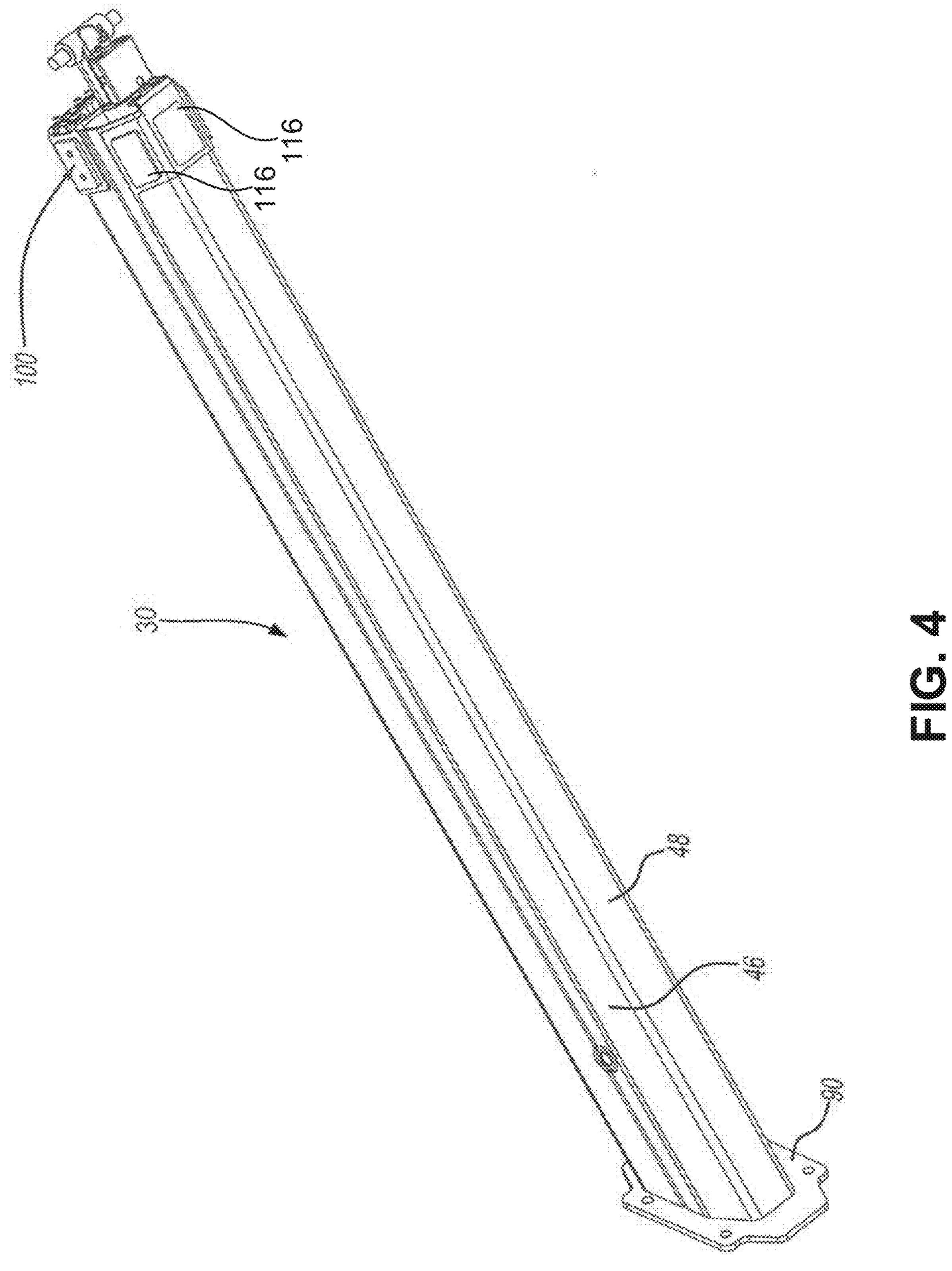
FIG. 4 is a bottom perspective rear view of the inner boom of FIG. 3.
Figure 5:
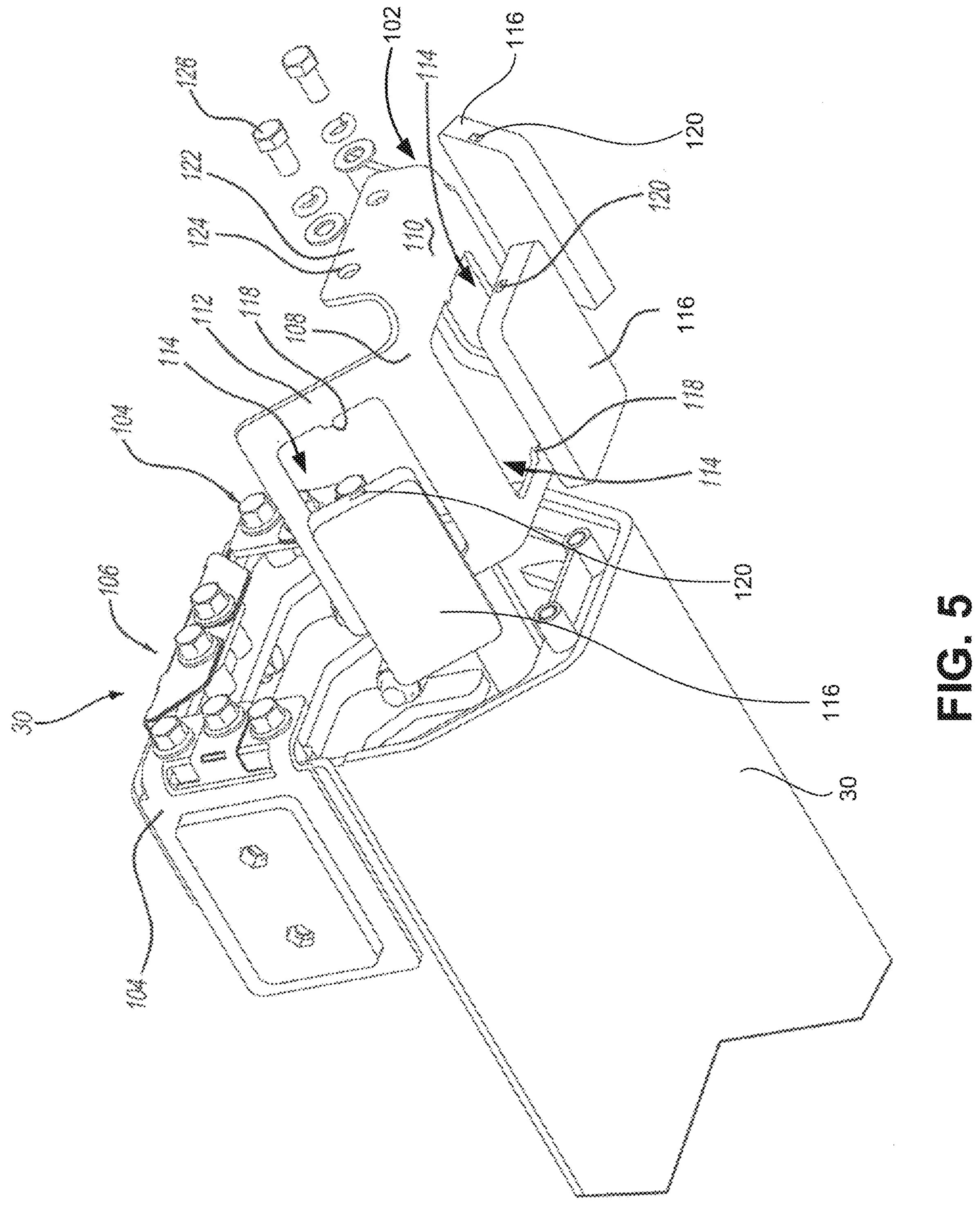
FIG. 5 is a partially exploded view of an end of the inner boom.
Figure 6:
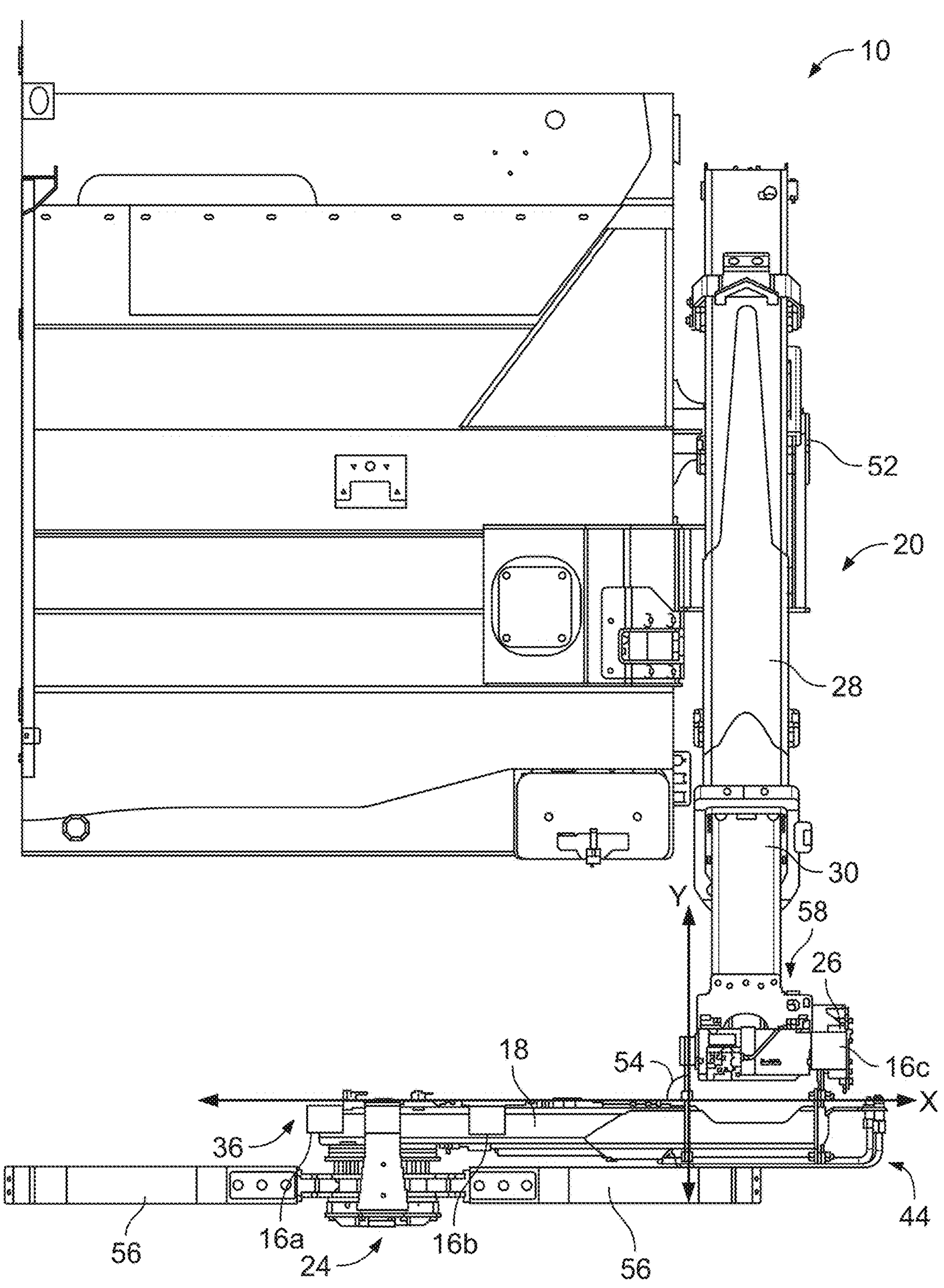
FIG. 6 is a side view of the boom telescopic arm assembly including example sensor locations.
Figure 9:
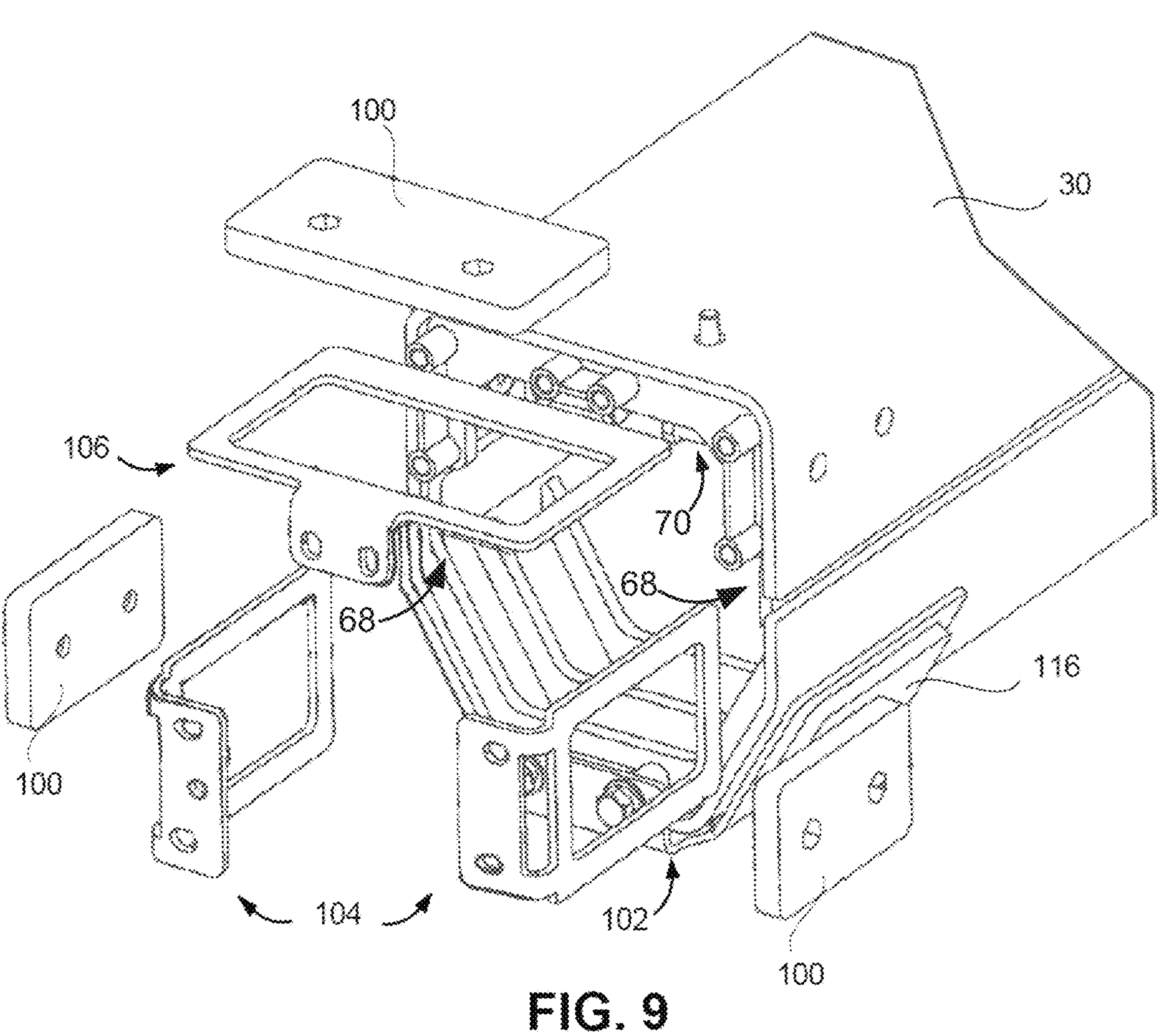
FIG. 9 is a partially exploded view of an end of the inner boom.

During operation, the outer boom 28 rotates relative to the refuse container 66 about mast pin 52 (shown in FIGS. 1, 2, and 6). The inner boom 30 translates telescopically relative to the outer boom 28. The receptacle grabber arm assembly 24 rotates relative to the inner boom 30. Referring to FIGS. 4, 5, and 9, the inner boom 30 includes first bearing pads 100 and second bearing pads 116 configured to enable a telescopic, sliding movement between the inner boom 30 and the outer boom 28. The first bearing pads 100 are secured to the inner boom 30 by brackets 104 and 106. The first bearing pads are attached to the brackets 104 and 106 via fasteners (e.g., bolts). As shown in FIG. 9, a pair of the first bearing pads 100 are attached to opposing brackets 104, which are configured to be secured to opposing inner walls 68 of the inner boom 30. An additional first bearing pad 100 is attached to the bracket 106, which is configured to be secured to a third inner wall 70 that is perpendicular to opposing inner walls 68.

The second bearing pads 116 are secured to the inner boom by bracket 102. The second bearing pads 116 are attached to the bracket 102 via a snap-in coupling mechanism. The bracket 102 has a body 108 that is substantially U-shaped. The body 108 includes a web portion 110 and a pair of opposing legs 112. The web portion 110 defines three apertures 114 configured to and sized to receive the second bearing pads 116. The snap-in coupling mechanism, which enables the second bearing pads 116 to be attached to the bracket 102, includes tabs 118 and cutouts 120. The tabs 118 project inward from opposing edges of a wall defining the apertures 114. The cutouts 120 are defined by opposing edges of each second bearing pad 116 and are configured to couple with the tabs 118. When the second bearing pads 116 are attached to the bracket 102, the tabs 118 couple with (e.g., snap into) the cutouts 120 to retain the second bearing pads 116 in the apertures 114. In some embodiments, the three apertures 114 may be identified with the same identifier (e.g., a reference numeral). In some embodiments, the apertures 114 may be identified with graduated marks or decals. The bracket 102 includes a tongue 122 that is substantially perpendicular to the web portion 110. The tongue 122 defines holes 124 that receive fasteners 126 to retain the bracket 102 on the inner boom 30.

During assembly, the brackets 102, 104, and 106 are positioned onto the inner boom 30. The bracket 102 with second bearing pads 116 is secured with the inner boom 30. Since fasteners are unable to pass through the inner boom 30 at this position, the second bearing pads 116 are snapped into the bracket 102 via the tabs 118, as previously described. During initial bearing pad installation or during replacement of the first bearing pads 100, the brackets 104, 106 are first loosely secured to the inner boom 30. Next, the first bearing pads 100 can be loosely secured (e.g., by loosely fastening the bearing pads via one or more fasteners) onto the inner boom 30. Next, one or more shims (not shown in the figures) can be positioned underneath the fastened first and second bearing pads 100, 116. After a satisfactory fit is achieved, the fasteners (e.g., nuts or bolts) are tightened down to secure the brackets 104, 106, shims, and first bearing pads 100, and bracket 102 with second bearing pads 116, to the inner boom 30. Thus, the bearing pads are received in the bore of the outer boom 28 and are located between an exterior surface of the inner boom 30 and an interior surface of the outer boom 28. A detailed description of an example bearing pad assembly is disclosed in U.S. Pat. No. 8,827,559, which is incorporated by reference in its entirety.

Alternatively, in other embodiments, a rail system may be positioned on outer boom 28. In some embodiments, the rail system includes guide rails the inner surface of outer boom 28. The guide rails may be configured to receive the plurality of inner and outer boom pads. In some embodiments, the rail system may include a bracket assembly coupled to the plurality of inner and outer boom pads. The bracket assembly may be slid along the rail system; thus, allowing a horizontal, telescopic motion of inner boom 30. The first and second bearing pads 100, 116 allow inner boom 30 to be equally spaced inside outer boom 28.

In some arrangements, first and second bearing pads 100, 116 are steel-reinforced, elastomeric bearings. In some cases, first and second bearing pads 100, 116 are elastomeric pads. In some embodiments, the elastomeric pads are made exclusively of an elastomer. Non-limiting examples of elastomers include polycholoroprene (e.g., Neoprene®) and natural rubber. In some examples, first and second bearing pads 100, 116 are polytetrafluoroethylene (PTFE) elastomeric bearings. In some embodiments, first and second bearing pads 100, 116 carry a load by contact stresses between a PTFE sheet and a steel mating surface that permits movement by sliding of the PTFE over the stainless steel and accommodates any deformation of the elastomer. In some examples, first and second bearing pads 100, 116 are fiberglass reinforced pads. In some embodiments, first and second bearing pads 100, 116 are cotton duck reinforced pads. In some embodiments, first and second bearing pads 100, 116 secured to the inner boom 30 are composed of a different material than the material of first and second bearing pads 100, 116 secured to the outer boom 28. In some embodiments, the bearing pads material and/or shape help reduce the frictional forces between a surface of a bearing pad secured to an outer surface of the inner boom 30 and a surface of a bearing pad secured to an inner surface of the outer boom 28. In some embodiments, the bearing pad material and/or shape transmit the load forces through the arm structure.

In some embodiments, first and second bearing pads 100, 116 minimize the distance between an inner surface of outer boom 28 and an outer surface of inner boom 30 in order to minimize friction. In some embodiments, first and second bearing pads 100, 116 are a different size and/or shape from each other. In some embodiments, first and second bearing pads 100, 116 have a thickness that is at least about 1 millimeter (mm) to about 50 mm. In some embodiments, first and second bearing pads 100, 116 have a thickness that is at least about 12 mm. In some embodiments, first and second bearing pads 100, 116 are square or rectangular bearing pads having a defined length and width. In some embodiments, first and second bearing pads 100, 116 have a length ranging from about 5 centimeters (cm) to about 15 cm. In some embodiments, first and second bearing pads 100, 116 have a width ranging from about 5 centimeters (cm) to about 15 cm. In some embodiments, first and second bearing pads 100, 116 are circular or oval boom pads having a defined diameter. In some embodiments, first and second bearing pads 100, 116 have a diameter ranging from about 5 centimeters (cm) to about 15 cm. In some embodiments, first and second bearing pads 100, 116 have any suitable shape and size.

The first and second bearing pads 100, 116 are sacrificial parts designed to provide bearing support to a sliding mechanism, while giving up material on an incremental basis to protect more substantial and valuable structures (e.g., the inner boom 30 and the outer boom 28). Without a sacrificial part, such as a bearing pad, friction, heat, and accelerated wear would cause performance and reliability deficiencies. The bearing pads are typically designed to be replaced based on fixed measurements (e.g., planned time intervals and number of cycles); however, this may not be the most cost-effective method of triggering replacement. This disclosure features systems and methods of using a sensor (e.g., an inclinometer) to monitor the geometric relative position of two members (e.g., the outer boom 28 and a grabber beam) of the collection arm in order to indicate bearing pad wear more accurately.

FIG. 6 shows a side view of the telescopic arm 20 in a rest position (e.g., with the grabber beam 18 and the grabber arms 56 parallel to a ground surface). As discussed, the telescopic arm 20 includes a grabber beam 18 that couples the receptacle grabber arm assembly 24 (shown in FIG. 1) to the inner boom 30. The refuse vehicle 10 includes a first sensor 16*a*, a second sensor 16*b*, and a third sensor 16*c*. In some embodiments, the refuse vehicle 10 includes only the first sensor 16*a*. In some embodiments, the refuse vehicle 10 includes only the second sensor 16*b*. In some embodiments, the refuse vehicle 10 includes only the third sensor 16*c*. In some embodiments, the refuse vehicle 10 includes the first sensor 16*a* and the second sensor 16*b*. In some embodiments, the refuse vehicle 10 includes the first sensor 16*a* and the third sensor 16*c*. In some embodiments, the refuse vehicle 10 includes the second sensor 16*b* and the third sensor 16*c*. In some embodiments, the refuse vehicle 10 includes one or more sensors. In some embodiments, the refuse vehicle 10 includes a number of sensors ranging from 1 to at least 5 (e.g., about 1 to 2 sensors, about 2 to 3 sensors, about 3 to 4 sensors, about 4 to 5 sensors, or more).

In some embodiments, the first sensor 16*a* and the second sensor 16*b* are mounted at different locations on a load-bearing limb (e.g., a grabber beam, an inner boom, and outer boom, and the like) of the refuse vehicle 10. In some embodiments, the first sensor 16*a* and the third sensor 16*c* are mounted at different locations on a load-bearing limb of the refuse vehicle 10. In some embodiments, the second sensor 16*b* and the third sensor 16*c* are mounted at different locations on a load-bearing limb of the refuse vehicle 10. In some embodiments, the refuse vehicle 10 includes one or more sensors that are mounted at different locations on a load-bearing limb of the refuse vehicle 10.

In some embodiments, the first sensor 16*a* and the second sensor 16*b* are mounted at a same location on a load-bearing limb of the refuse vehicle 10. In some embodiments, the first sensor 16*a* and the third sensor 16*c* are mounted at a same location on a load-bearing limb of the refuse vehicle 10. In some embodiments, the second sensor 16*b* and the third sensor 16*c* are mounted at a same location on a load-bearing limb of the refuse vehicle 10. In some embodiments, the refuse vehicle 10 includes one or more sensors that are mounted at a same location on a load-bearing limb of the refuse vehicle 10.

In some embodiments, the first, second, and/or third sensors 16*a*, 16*b*, 16*c* are inclinometers. The inclinometers of the disclosure can measure an angle ranging from about 0 degrees to about 360 degrees with respect to one or more axes (e.g., horizontal or vertical axes). The inclinometers can be analog or digital output type inclinometers. The inclinometers can detect vibration of a load-bearing limb of the refuse vehicle 10. In some embodiments, the first, second, and/or third sensors 16*a*, 16*b*, 16*c* are dynamic inclinometers. In some embodiments, the first, second, and/or third sensors 16*a*, 16*b*, 16*c* are static inclinometers.

In some embodiments, the refuse vehicle 10 includes only one sensor that can be secured to a load-bearing limb (e.g., a grabber beam, an inner boom, and outer boom, and the like) of the refuse vehicle 10. For example, the sensor can be secured to or mounted on a grabber beam 18 of the refuse vehicle 10. In some embodiments, the sensor can be secured to or mounted on any location along the grabber beam 18. For example, in some embodiments, the sensor can be secured at or mounted on at or near a distal end 36 of the grabber beam 18, relative to first or second bearing pads 100, 116 (see, e.g., first sensor 16*a*). In some embodiments, the sensor can be secured at or mounted on at or near a proximal end 44 of the grabber beam 18. In some embodiments, the sensor can be secured to or mounted on any portion of the grabber beam 18 located between the distal end 36 and the proximal end 44 of the grabber beam 18. In some embodiments, the sensor can be secured to or mounted on a portion of the grabber beam 18 located at about or near the center between the distal end 36 and the proximal end 44 of the grabber beam 18 (see, e.g., second sensor 16*b*).

In some arrangements, the sensor can be secured to or mounted on the inner boom 30 of the refuse vehicle 10. In some embodiments, the sensor can be secured at or mounted on at or near a distal end 58 of the inner boom 30, relative to first or second bearing pads 100, 116. In some embodiments, the sensor can be secured at or mounted on or near the rotary actuator 26 (see, e.g., third sensor 16*c*). In some arrangements, the sensor can be secured to or mounted on the outer boom 28 of the refuse vehicle 10.

The first, second, and/or third sensors 16*a*, 16*b*, 16*c* are configured to output data indicating a position of a load-bearing limb of the telescopic arm 20. The position includes an angular position. The angular position is measured relative to a vertical axis and/or relative to a horizontal axis. For example, the angular position can be angle 54, which is measured relative to the horizontal axis X and the vertical axis Y, as shown in FIG. 6.

Figure 7:
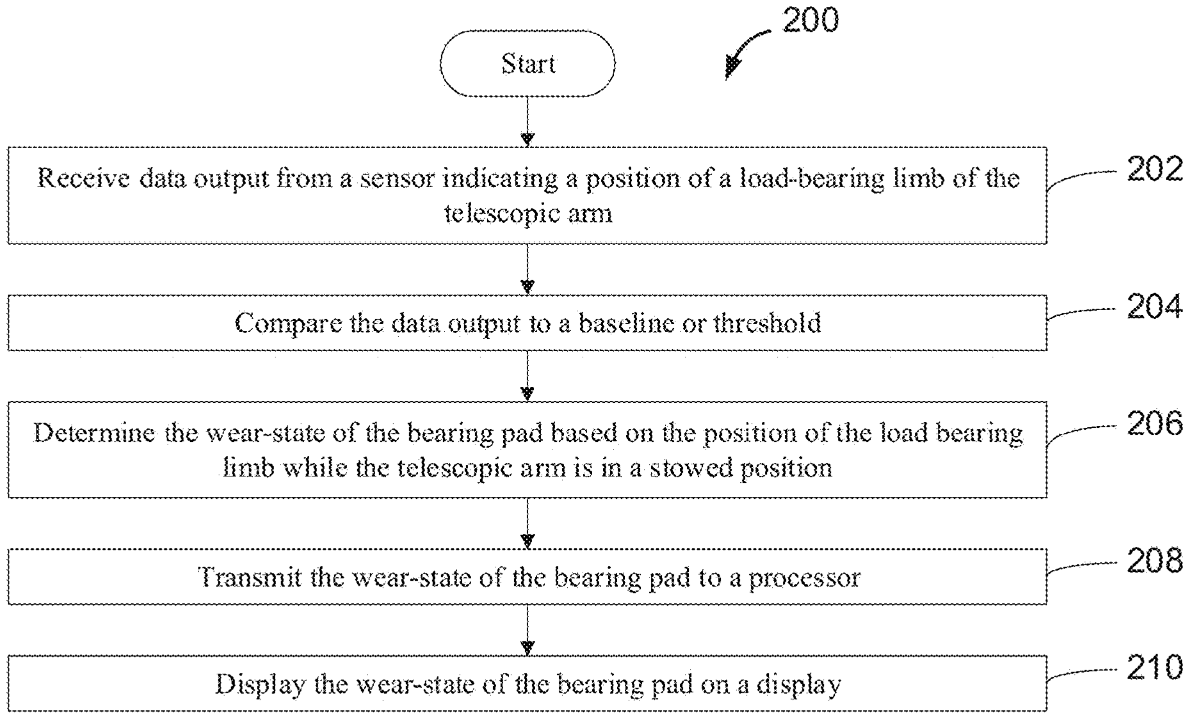
FIG. 7 is a flow chart of an example method of monitoring a wear-state of a bearing pad.

FIG. 7 shows an example method 200 of monitoring a wear-state of a bearing pad residing between the inner boom 30 and the outer boom 28 of the telescopic arm 20 carried on the refuse vehicle 10. In a first step 202, the processor 62 receives and/or is configured to receive data output from the first, second, and/or third sensors 16*a*, 16*b*, 16*c* indicating a position (e.g., an angular position) of a load-bearing limb (e.g., the grabber beam 18, the inner boom 30, or the like) of the telescopic arm 20. The processor 62 then compares the data output to one or more baselines or one or more thresholds, as shown in second step 204. For example, in some embodiments, a first baseline can be the position (e.g., an angular position) or the angle 54 of a load-bearing limb at a time when the bearing pads are initially installed (i.e., when the bearing pads are new and/or have no substantial wear or reduced thickness). For example, the one or more thresholds can be static, predetermined thresholds. In some embodiments, two or more measurements of the position (e.g., an angular position) or the angle 54 of a load-bearing limb may be taken at a time when the bearing pads are initially installed, and an average of the two or more measurements may be calculated to normalize the baseline readings. In some embodiments, further statistical analyses may be done to the two or more measurements in order to identify and discard false positive and/or false negative readings that may be caused by vibration and/or change in position of various components of the refuse vehicle under normal operation of the telescopic arm, for example.

In some embodiments, the baseline is defined as angle 54 ranging from about 0 degrees to about 5 degrees (e.g., about 0 degrees to about 1 degree, about 1 degree to about 2 degrees, about 2 degrees to about 3 degrees, about 3 degrees to about 4 degrees, or about 4 degrees to about 5 degrees). In some embodiments, the baseline is defined as angle 54 ranging from about 0 degrees to about 20 degrees (e.g., about 0 degrees to about 5 degrees, about 5 degree to about 10 degrees, about 10 degrees to about 15 degrees, or about 15 degrees to about 20 degrees).

Alternatively, in some arrangements, one or more thresholds can be calculated based on historical data. The processor 62 is configured to calibrate the one or more thresholds based on historical data output from the sensor. For example, in some embodiments, the position (e.g., an angular position) or the angle 54 of a load-bearing limb can be measured intermittently throughout a set period of time while the telescopic arm 20 is in a rest position. Using this method, the most recent measurement can be compared to one or more historical thresholds (e.g., a penultimate measurement or the average historical threshold) and a percent change of position and/or of the angle 54 can be calculated. The percent change indicates how much the position or angle 54 has deviated from the historical threshold and can inform a user regarding any deviation from the threshold throughout a set period of time (e.g., throughout the lifetime of the bearing pads).

The processor 62 can monitor an incremental change in the position of the load-bearing limb based on the data output from the sensor. Non-limiting examples of feedback provided by the sensors include the angular position of the load-bearing limb and/or the angle 54. The processor 62 calculates the calculated incremental change and compares it to a threshold. In some embodiments, based on historical data, the processor 62 may compare the incremental change and the elapsed time after bearing pad installation to other data sets from one or more different refuse vehicles. These other data sets can have known incremental changes and known bearing pad wear-states (e.g., thicknesses) at known, post-bearing pad installation time intervals.

Next, in a third step 206, the processor 62 determines the wear-state of the bearing pad based on the results of the comparison done in second step 204. For example, if the processor 62 calculates that the calculated incremental change exceeds the threshold, then the processor 62 determines that the bearing pad needs to be replaced. In other examples, based on the comparison to other data sets (e.g., from one or more different refuse vehicles described previously), the processor 62 may correlate the calculated incremental change to the known values from the other data sets and determine a percentage of wear-state (e.g., 100% indicating a new bearing pad and 5% indicating a bearing pad that requires replacement).

In some embodiments, the percent deviation from a threshold or baseline ranges from about 6% to about 8% (e.g., 6% to about 7% or about 7% to about 8%). In some embodiments, the percent deviation from a threshold or baseline ranges from about 1% to about 30% (e.g., 1% to about 5%, about 5% to about 10%, about 10% to about 15%, about 15% to about 20%, about 20% to about 25%, or about 25% to about 30%). In other words, if the incremental change in the angle 54 or in the position of a load-bearing limb deviates at least about 6% to about 8% from the threshold or baseline, then the processor 62 determines that the bearing pad needs to be replaced or at least needs to be inspected.

Next, the processor 62 transmits the wear-state of the bearing pad to a second processor of the refuse vehicle (e.g., of the onboard computer control system), as shown in fourth step 208. In some embodiments, the processor 62 transmits the wear-state of the bearing pad to a second processor located in a remote location. For example, the second processor may be a computer in a network operatively connected with the refuse vehicle (e.g., a computer in a central office). In some embodiments, the computer is a mobile device that is operatively connected with the refuse vehicle (e.g., a smartphone, a tablet, or the like). In some embodiments, the computer is a computer of the refuse vehicle 10. In some embodiments, the processor 62 transmits one or more signals including information regarding the wear-state of the bearing pad wirelessly to a second processor or a network. In some embodiments, the processor transmits one or more signals including information regarding the wear-state of the bearing pad to a second processor or a network via a wired connection.

The refuse vehicle includes a user interface configured to present the wear-state of the bearing pad to a user. In some examples, the output devices include a display that informs a user or operator regarding the wear-state of one or more first and second bearing pads 100, 116, as shown in fifth step 210. The display can be a display monitor of a computer of a network (e.g., located in a central office). In some embodiments, the display can be a display in the refuse vehicle located in the cab 12 of the refuse vehicle 10. In some embodiments, the display is a display of a mobile device (e.g., a smartphone, a tablet, or the like) that is operatively connected with the refuse vehicle 10.

Figure 8A:
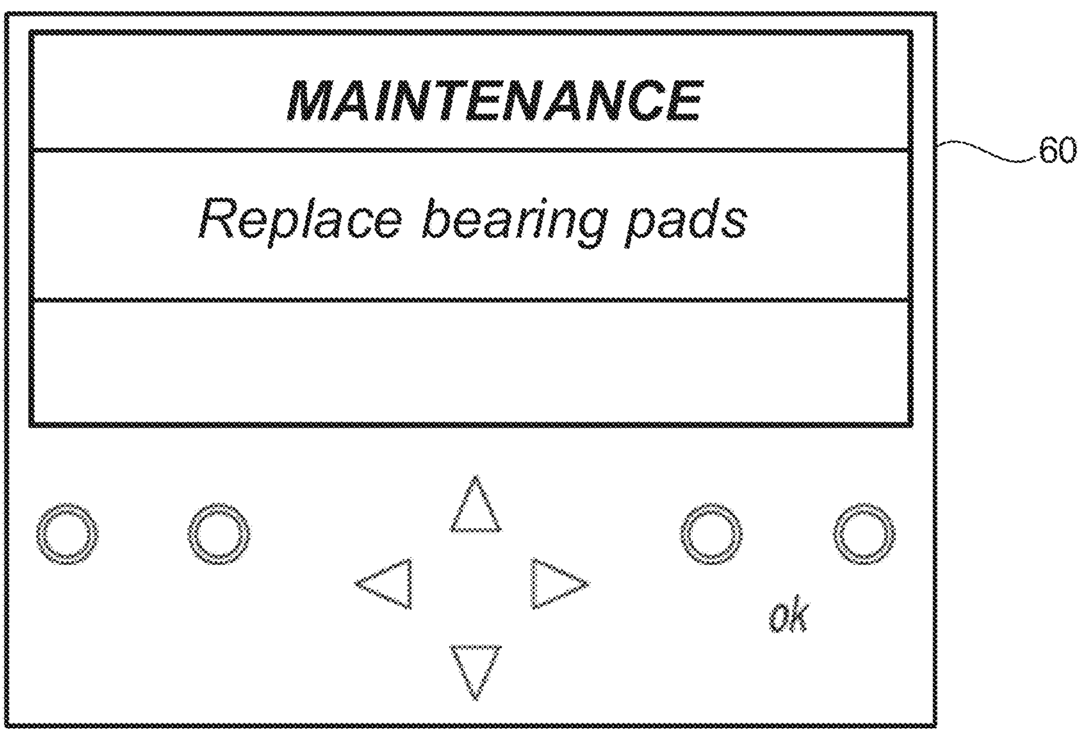
FIGS. 8A and 8B are front views of example displays.
Figure 8B:
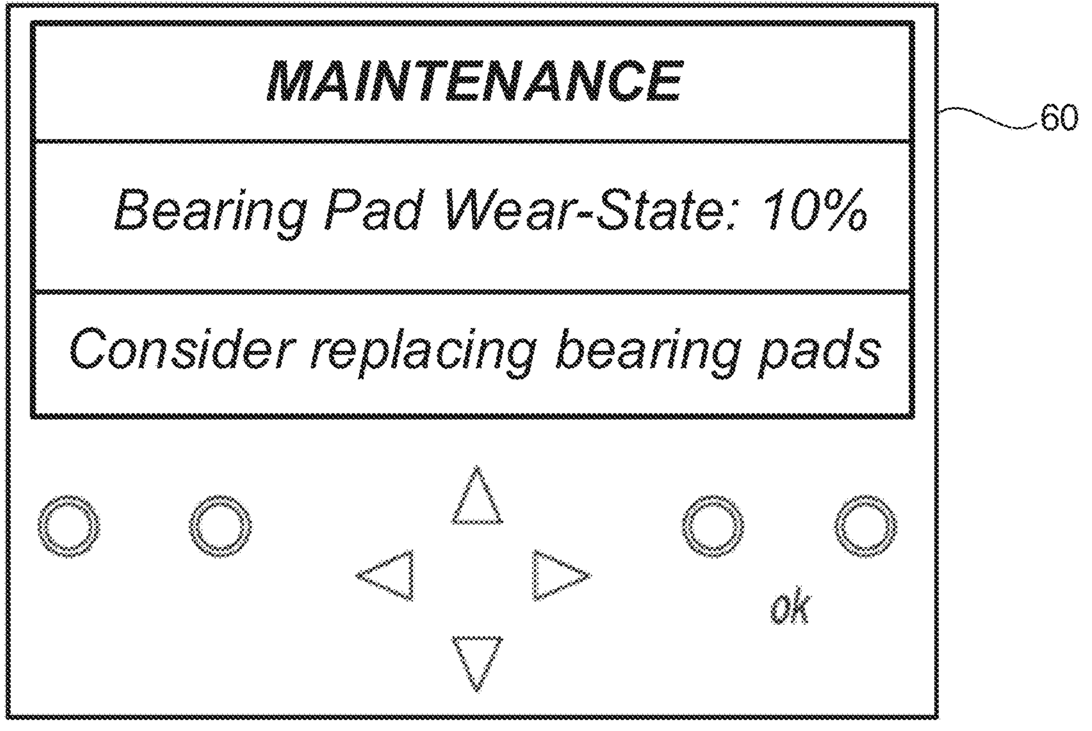

FIGS. 8A and 8B show example displays of the refuse vehicle 10. The display 60 can output a binary message informing the user or operator there is a need to replace the bearing pads, as shown in FIG. 8A, or, alternatively, that the bearing pads are in operating condition (i.e., that there is no need to replace the bearing pads). In some embodiments, the display 60 can output a percentage of wear of the bearing pads. For example, a display of 100% wear-state indicates the bearing pads are new; a display ranging from about 0% to about 10% indicates the bearing pads are almost entirely worn out and should be replaced. FIG. 8B shows an example output where the display 60 is showing a wear-state status of 10%, thereby indicating the bearing pads require replacement.

In some embodiments, the computer control system is configured to generate an alert or an alarm (e.g., a visual or audio alarm) that alerts the user regarding the wear-state of the bearing pad. For example, the computer control system may generate an alarm alerting the user that of a structural failure of the refuse vehicle (e.g., of a load-bearing limb). For instance, this may occur when a position of the load-bearing limb is detected to be outside of operational bounds. In some embodiments, the computer control system can store any type of data related to the methods of monitoring the wear-state of the bearing pad (e.g., sensor data, baseline or threshold data, including historical thresholds, elapsed time after installation of bearing pads, and the like). In some embodiments, the processor 62 is coupled to the power source and is connected to one or more other processors (e.g., computers) via a communication network. In some embodiments, the processor 62 is coupled to the input devices and to output devices via a wired or wireless connection.

In some embodiments, the computer control system is configured to transfer any type of data related to the methods of monitoring the wear-state of the bearing pad to a cloud. As used herein, the term "cloud" refers to one or more hardware and/or software components that deliver or assist in the delivery of computational and/or storage capacity, including, but not limited to, one or more of a client, an application, a platform, an infrastructure, and/or a server. The term "cloud" may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a back-end hardware, a back-end software, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network and/or the Internet. In some embodiments, the computer control system is configured to transfer any type of data related to the methods of monitoring the wear-state of the bearing pad to a back-end software. In some embodiments, the computer control system is configured to provide an alert or an alarm regarding the wear-state of the bearing pad to the back-end software. In some embodiments, the back-end software may be a software used in a refuse vehicle fleet management system.

While the above-discussed refuse vehicle 10 and telescopic arm 20 have been described and illustrated with respect to certain dimensions, shapes, arrangements, configurations, material formulations, and methods, in some embodiments, a refuse vehicle 10 or a telescopic arm 20 that is otherwise substantially similar in construction and function to the refuse vehicle 10 or a telescopic arm 20 may include one or more dimensions, shapes, arrangements, configurations, and/or materials formulations that are different from the ones discussed above or may be used with respect to methods that are modified as compared to the methods described above. For example, while the refuse vehicle 10 has been described and illustrated as a first, second, and/or third sensor 16*a*, 16*b*, 16*c*, in some embodiments, the refuse vehicle 10 includes one or more alignment marks that are manually or mechanically marked on one or more members of the telescopic arm 20 (e.g., on a load-bearing limb) such that the one or more alignment marks align when one or more bearing pads are new or are in working condition, but slowly show to be misaligned as the bearing pads wear. For example, one or more alignment marks can be mechanically scribed (e.g., etched) on one or more members of the telescopic arm 20. In another example, one or more alignment marks can be manually labeled (e.g., by using an adhesive label, ink, or the like) on one or more members of the telescopic arm 20.

While the refuse vehicle 10 has been described and illustrated as including a sensor that can be an inclinometer configured to measure an angle or angular position of a load-bearing limb of the telescopic arm, in some embodiments, a refuse vehicle that is otherwise substantially similar in construction and function to the refuse vehicle 10 may include an accelerometer in addition to or in lieu of the inclinometer. In some embodiments, the accelerometer can be used to measure an acceleration of a load-bearing limb when in dynamic movement. In some embodiments, the accelerometer may be used to determine a wear-state of the bearing pad based on the acceleration and/or movement of one or more load-bearing limbs of the telescopic arm.

While the refuse vehicle 10 has been described and illustrated as having a telescopic arm 20 including hydraulically-driven actuators that are configured to move the telescopic arm 20 between different positions, in some embodiments, a refuse vehicle that is otherwise substantially similar in construction and function to the refuse vehicle 10 may include one or more electrically-driven actuators that are configured to move one or more components of the telescopic arm. In some embodiments, the electrically-driven actuators are configured to move the telescopic arm between different positions (e.g., dump position and pick-up position).

While the refuse vehicle 10 has been described and illustrated as having a processor 62 that is configured to receive data output from the sensor 16 and determine a wear-state of the bearing pad based on the position of the load-bearing limb, in some embodiments, a refuse vehicle that is otherwise substantially similar in construction and function to the refuse vehicle 10 may include one or more processors that are not on board the refuse vehicle. In some embodiments, the processor that is configured to receive data output from the sensor 16 and determine a wear-state of the bearing pad based on the position of the load-bearing limb is at a remote location. In some embodiments, the remote location is a central dispatch office. In some embodiments, the processor is a component in a mobile device (e.g., a smartphone, a tablet, or the like), and the remote location is the location where the mobile device is located. In some embodiments, the processor is a component in a computer (e.g., a desktop), and the remote location is the location where the computer is located.

While the above-discussed refuse vehicles have been described and illustrated as including certain dimensions, shapes, arrangements, configurations, and material formulations, and with respect to certain methods, in some embodiments, a refuse vehicle that is similar in construction and function to any of the above-discussed refuse vehicles may include one or more dimensions, shapes, arrangements, configurations, and/or material formulations that are different from the ones discussed above and/or that may be used with respect to methods that are modified as compared to the methods described above.

Furthermore, while a number of examples have been described for illustration purposes, the foregoing description is not intended to limit the scope of the invention, which is defined by the scope of the appended claims. There are and will be other examples and modifications within the scope of the following claims.

What is claimed is:

1. A work vehicle, comprising:
- a sliding mechanism, comprising:
  - a first structural support;
  - a second structural support coupled to and at least partially received by the first structural support; and
  - a bearing pad located between a first surface of the first structural support and a second surface of the second structural support, the bearing pad configured to provide bearing support that enables a sliding movement of the second structural support relative to the first structural support;
- a load-bearing component coupled with the sliding mechanism;
- a sensor configured to output sensor data that indicates positioning of the load-bearing component; and
- a processor configured to:
  - determine, based at least in part on the sensor data, a position of the load-bearing component; and
  - determine, based at least in part on the position of the load-bearing component, a wear-state of the bearing pad.

2. The work vehicle of claim 1, wherein the position comprises an angular position.

3. The work vehicle of claim 1, wherein the sensor is mounted on the load-bearing component.

4. The work vehicle of claim 1, wherein the sensor is an inclinometer.

5. The work vehicle of claim 1, further comprising a mounting assembly configured to pivotally secure the first structural support with the work vehicle.

6. The work vehicle of claim 5, wherein the first structural support comprises an outer boom, and wherein the second structural support comprises an inner boom nested within the outer boom and extendable relative to the outer boom.

7. The work vehicle of claim 6, further comprising an actuator configured to move the inner boom relative to the outer boom.

8. The work vehicle of claim 7, wherein the actuator comprises a linear actuator coupled with the inner boom and configured to extend and retract the inner boom within the outer boom.

9. The work vehicle of claim 1, wherein the load-bearing component couples a grabber arm assembly to the sliding mechanism, and wherein the grabber arm assembly comprises grabber arms configured to move between grasping and release positions to selectively grab and release objects.

10. The work vehicle of claim 9, further comprising a container, wherein the work vehicle is operable to load objects into the container using the sliding mechanism and the grabber arm assembly.

11. The work vehicle of claim 1, wherein, to determine the wear-state of the bearing pad, the processor compares the position of the load-bearing component to one or more thresholds.

12. The work vehicle of claim 11, wherein the processor is configured to calibrate the one or more thresholds based on historical sensor data output from the sensor.

13. The work vehicle of claim 1, further comprising a user interface configured to present the wear-state of the bearing pad to a user.

14. The work vehicle of claim 1, further comprising a second bearing pad and a second sensor, wherein the processor is further configured to determine the wear-state of the second bearing pad based at least in part on second sensor data output from the second sensor.

15. The work vehicle of claim 14, wherein the sensor is a first sensor, and the first and second sensors are mounted at different locations of the load-bearing component.

16. The work vehicle of claim 1, further comprising a bracket configured to attach the bearing pad and one or more other bearing pads to at least one of the first structural support or the second structural support.

17. A method of monitoring a wear-state of a bearing pad residing between components of a sliding mechanism of a work vehicle, the method comprising:
- determining, based at least in part on sensor data output from a sensor, a position of a load-bearing component coupled with the sliding mechanism, wherein the sliding mechanism comprises:
  - a first structural support;
  - a second structural support coupled to and at least partially received by the first structural support; and
  - the bearing pad located between a first surface of the first structural support and a second surface of the second structural support, the bearing pad configured to provide bearing support that enables a sliding movement of the second structural support relative to the first structural support; and
- determining, based at least in part on the position of the load-bearing component, a wear-state of the bearing pad.

18. The method of claim 17, wherein the determining the position of the load-bearing component comprises determining an angular position of the load-bearing component.

19. The method of claim 18, wherein the sensor is an inclinometer mounted on the load-bearing component.

20. The method of claim 17, wherein the determining the wear-state of the bearing pad comprises comparing the position of the load-bearing component to one or more thresholds.

21. A work vehicle, comprising:

a sliding mechanism, comprising:

a first support means;

a second support means; and a pad means located between the first support means and the second support means, the pad means for providing bearing support that enables a sliding movement of the second support means relative to the first support means;

a load-bearing component coupled with the sliding mechanism;

a sensor configured to output sensor data that indicates positioning of the load-bearing component; and a processor configured to:

determine, based at least in part on the sensor data, a position of the load-bearing component; and determine, based at least in part on the position of the load-bearing component, a wear-state of the pad means.

* * * * *